(12) United States Patent
Govindswamy et al.

(10) Patent No.: US 7,532,541 B2
(45) Date of Patent: May 12, 2009

(54) OBJECT DETECTION USING ACOUSTIC IMAGING

(75) Inventors: Kiran Govindswamy, Rochester Hills, MI (US); Gary Rogers, Birmingham, MI (US)

(73) Assignee: FEV Engine Technology, Inc, Auburn Hills, MI (US)

( * ) Notice: Subject to any disclaimer, the term of this patent is extended or adjusted under 35 U.S.C. 154(b) by 38 days.

(21) Appl. No.: 11/678,207

(22) Filed: Feb. 23, 2007

(65) Prior Publication Data

US 2007/0195646 A1 Aug. 23, 2007

Related U.S. Application Data

(60) Provisional application No. 60/776,041, filed on Feb. 23, 2006.

(51) Int. Cl.
*G01S 15/89* (2006.01)
(52) U.S. Cl. .......................... 367/88; 367/11
(58) Field of Classification Search ............ 367/7, 367/88, 93
See application file for complete search history.

(56) References Cited

U.S. PATENT DOCUMENTS

| 5,681,986 | A | | 10/1997 | Merk et al. |
| 5,699,318 | A | * | 12/1997 | Fischer .................. 367/88 |
| 5,722,618 | A | * | 3/1998 | Jacobs et al. .............. 244/137.1 |
| 5,940,347 | A | | 8/1999 | Raida et al. |
| 6,700,833 | B2 | * | 3/2004 | Erikson .................. 367/88 |
| 6,707,761 | B2 | | 3/2004 | Erikson |
| 6,826,117 | B2 | * | 11/2004 | Haase et al. .............. 367/119 |
| 6,829,197 | B2 | | 12/2004 | Erikson |
| 7,149,147 | B1 | * | 12/2006 | Goldman et al. .......... 367/88 |
| 2003/0053373 | A1 | | 3/2003 | Erikson |
| 2003/0198131 | A1 | * | 10/2003 | Chandler .................. 367/7 |
| 2007/0195646 | A1 | * | 8/2007 | Govindswamy et al. ...... 367/88 |

FOREIGN PATENT DOCUMENTS

| WO | WO-02075362 | 9/2002 |
| WO | WO-03025852 | 3/2003 |

OTHER PUBLICATIONS

"Sound Defense." New Scientist, issue 2317, Nov. 14, 2001.
LRAD Product Brochure "The Sound of Force Protection." American Technology Corporation, 2004.

* cited by examiner

*Primary Examiner*—Dan Pihulic
(74) *Attorney, Agent, or Firm*—Gifford, Krass, Sprinkle, Anderson & Citkowski, P.C.

(57) ABSTRACT

Embodiments of the present invention include methods and apparatus for the detection of objects using acoustic imaging. Vibrational resonance characteristics of man-made objects may be significantly different from those of the surrounding natural materials, allowing an acoustic image to highlight the position of the object, even if the object is concealed from visual imaging.

13 Claims, 4 Drawing Sheets

OBJECT DETECTION USING ACOUSTIC IMAGING

REFERENCE TO RELATED APPLICATION

This application claims priority to U.S. Provisional Patent Application Ser. No. 60/776,041, filed Feb. 23, 2006, the entire content of which is incorporated herein by reference.

FIELD OF THE INVENTION

The invention relates to acoustic imaging, for example the acoustic imaging detection of man-made objects.

BACKGROUND OF TEE INVENTION

Conventional visual imaging reveals surface properties, such as reflectivity, color, and the like. However, the interior properties of objects and visually concealed objects remain unknown. For example, buried objects cannot be detected by conventional visual imaging, such as photography.

There is often a great need to detect objects that cannot be immediately seen using visual imaging. Such target objects include buried hazards such as landmines.

SUMMARY OF THE INVENTION

Embodiments of the present invention include methods and apparatus for the detection of target objects (such as manmade objects) using acoustic imaging. The target objects may be concealed from visual detection, for example through being buried, camouflaged, or otherwise hidden. Target objects include metal structures, including vehicles, pipelines, storage vessels, vehicles, and the like. Target objects may further include explosive devices such as improvised explosive devices (IEDs), landmines, and the like. Target objects may also include natural objects and features such as caves, voids, underground streams, and the like.

Vibrational resonance characteristics of man-made objects may be significantly different from those of surrounding material, allowing an acoustic image to highlight the position of the object, even if visual images show no evidence of the object. Man-made objects often have acoustic resonances related to the size and shape of the object, and acoustic data can be filtered to bandpass an expected resonance frequency range of a target object.

An example apparatus for assisting the location of one or more target objects within terrain provides an acoustic image of terrain, and comprises an acoustic energy source operable to provide acoustic energy to the terrain, an acoustic imaging device, operable to receive acoustic signals from the terrain and to provide image signals, an electronic circuit operable to receive the image signals from the acoustic imaging device and to provide display signals, and a display, operable to receive display signals from the electronic circuit and to provide a visual representation of the acoustic signals, an acoustic image. Acoustic energy includes sound waves directed towards the terrain through air, or vibrations coupled to the terrain using devices such as an actuator.

The electronic circuit may further receive other data, such as a visual image or map data over which the acoustic image may be overlaid. The electronic circuit may include a filter configured to selectively transmit image signals at frequencies proximate to an expected mechanical resonance of the target object.

The acoustic energy source may be an actuator in mechanical communication with the terrain and imparting vibrational energy to the terrain. In this specification, the term acoustic energy includes the vibrational energy of objects. The actuator may be a hydraulic actuator associated with a land vehicle on the terrain surface. The acoustic energy source may also be a high energy directed acoustic energy source. In some examples of the present invention, the acoustic energy source and acoustic imaging device are both supported on a single vehicle, such as an aircraft, for example an unmanned aerial vehicle.

An example method of detecting a target object within terrain comprises directing acoustic energy towards the terrain, receiving an acoustic signal from terrain, the acoustic signal including a contribution from the target object, forming an acoustic image using the acoustic signals, the acoustic image showing a distribution of acoustic signal strength received from the terrain, and locating the target object using the acoustic image. In a typical example, the object may be located as a region of high acoustic signal generation, or hotspot, within the acoustic image of the terrain.

DETAILED DESCRIPTION OF THE INVENTION

Figure 1:
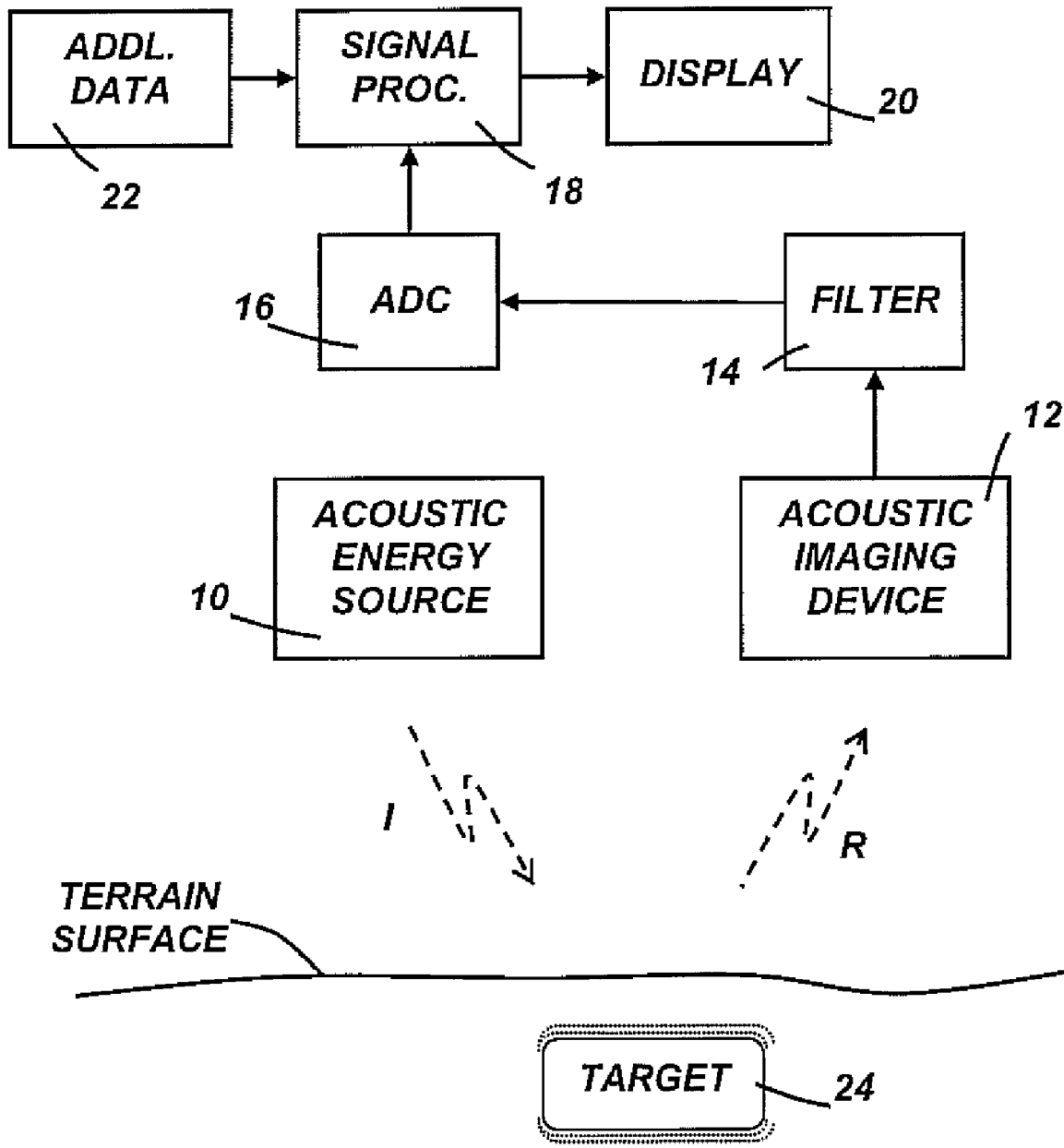
FIG. 1 is a schematic of a system according to an embodiment of the present invention.

The invention relates to acoustic imaging, including the detection of target objects (such as manmade objects) using acoustic imaging. The target objects may be buried or otherwise concealed from conventional visual detection. Methods and apparatus according to the present invention can be used to detect various objects, even if the surface of the target object is not visually apparent to an observer. Possible target objects include: pipelines; vehicles; explosive devices such as improvised explosive devices (IEDs), landmines, and the like; objects concealed by snow, water, or other natural condition, including submarines just below the water surface; cables including buried cables; any manmade objects, including buildings, having camouflage; and other objects providing an acoustic signature distinguishable from a surrounding medium.

Vibrational resonance characteristics of man-made objects are often significantly different from those of surrounding material. For example, manmade objects often have acoustic resonances related to the size and shape of the object. Acoustic data can be filtered in an expected resonance frequency range of a target object to improve detection ability. Further, the amplitude of acoustic energy directed towards the terrain can be increased, and/or the frequency distribution modified, until the target object is detected. Also, acoustic energy will be reflected, depending upon the relative densities of target objects and the surrounding terrain.

Embodiments of the present invention can also be used to detect natural features below the ground, such as ore deposits, minerals, oil, caves, watercourses, subterranean ponds, ice, and the like. Embodiments of the present invention can also be used underwater, for example using a submarine in place of the aircraft illustrated in some example, to detect undersea cables, mines, and the like.

Any visually camouflaged object having a detectable acoustic signature can be detected using acoustic imaging. Acoustic energy is delivered towards the vicinity of the target object, and the target object detected from its acoustic signature, the response to acoustic energy.

For conciseness, the term "terrain" will be used to refer to the vicinity of the target object(s), though this is not intended to be limiting. For example, "terrain" may be used to refer to the ground around a target object, including the ground surface and sub-surface regions. In this case, the term terrain surface includes the ground surface. Terrain may further include water features, ice, and natural objects on the surface of the ground such as boulders and plants.

Acoustic Imaging Devices

Acoustic image data are collected using an acoustic imaging device, such as an acoustic camera comprising a directional microphone array. An acoustic camera may be used to provide accurate acoustic information at distances greater than 100 meters, for example from an aircraft over the terrain, as is discussed in more detail elsewhere. The detected acoustic image, or sound field, can be presented as a false color image such as a contour plot. The acoustic image may be combined with one or more other sources of data, such as visual image data, IR image data (such as a thermal image), positional data (such as a map or GPS data), or other electromagnetic image (such as a combined IR-visible image, or radar image). For example, the acoustic image can be overlaid on a visual image such as a high-resolution digital photograph.

The acoustic imaging device may comprise a two-dimensional array of acoustic sensors. In other examples, the acoustic imaging device may comprise a linear array of acoustic sensors, and a two-dimensional image formed using the movement of a support vehicle. In other examples, one or more acoustic sensors may be raster scanned across a region of terrain.

The acoustic imaging device can be carried by an aircraft, for example, an airplane (which may be an unmanned drone), helicopter, balloon, rocket, and the like, the aircraft flying over the terrain to be imaged. In other examples, the acoustic imaging device can be otherwise elevated above the terrain to be imaged, for example supported by a pole, or disposed at an elevated location, such as in a tree or on a hill, or suspended from a land vehicle, via a crane, boom, or the like.

Acoustic Energy Sources

Acoustic energy can be delivered to a target object (and the surrounding terrain) using one or more of various approaches. Methods for delivering acoustic energy include directing high energy acoustic energy at the terrain (for example, using a sonic cannon as the acoustic energy source), and imparting vibrational energy directly to the terrain (for example, using a hydraulic actuator as the acoustic energy source). These approaches correspond to acoustic imaging using reflected ground energy and acoustic imaging using a forced ground response, respectively. The term acoustic energy source includes vibrational energy sources, such as an actuator striking the ground. An example of a sonic cannon is an elongate acoustic emitter for emitting acoustic energy which is in-phase and directional, as described in U.S. Pat. No. 5,940,347 to Raida et al.

The acoustic energy (such as directed acoustic energy or vibratory input) can excite structural resonances of the target object. For example, a metal container, body panel of a vehicle, or other metal structure will typically have one or more structural resonances. A resonance may be excited even if the object is buried beneath the surface of the ground. Aerial acoustic imaging can be used in tandem with the forced ground response to measure the acoustic response of the ground surface under the forced vibratory inputs. The frequency characteristics of the acoustic energy can be chosen to excite known resonances of a particular target object. If signal energy is below an acceptable level, the amplitude of the acoustic energy can be increased until acceptable signals are detected. Further, the detected acoustic signal can be filtered so as to select expected resonances of the target object.

An example apparatus comprises an acoustic energy source, an acoustic imaging device, and an electronic circuit operable to receive image data from the imaging device and display it on a screen in a form useful to a person. The electronic circuit may comprise a computer, for example including a processor, memory, clock, display driver, and other components. An analog-to-digital converter (ADC) may be used to convert analog sensor signals into digital signals. One or more filters may be used to perform one or more of the following: select acoustic signal frequency ranges associated with target objects; reject noise signals (such as those arising from a carrying vehicle); and/or provide low-pass, high pass, band pass, or notch filter functions. The acoustic energy source and acoustic energy systems may be in electronic communication, for example to synchronize excitation and signal collection, or to allow collection of signals during intervals between energy pulses directed at the terrain.

FIG. 1 illustrates a system according to an embodiment of the present invention. The system comprises an acoustic energy source 10, an acoustic imaging device 12, filter 14, analog-to-digital converter (ADC) 16, signal processor 18, display 20, and additional data source 22. In this example, a target object 24 is located within the terrain, slightly below the surface. However, the target object may also be on the surface of the terrain, and possibly camouflaged. The jagged line I represents acoustic energy directed towards the terrain (including the target object 24), and the jagged line R represents acoustic energy received by the imaging device. The dotted lines around the target object represent vibrations, such as mechanical resonances, induced by the operation of the acoustic energy source.

The acoustic imaging device may comprise an acoustic camera, such as a directional microphone array. The filter 14 selects one or more acoustic frequency bands associated with target objects, while tending to rejecting noise. The ADC 16 converts analog signals into digital signals. This component may is not necessary if digital sensors are used. The signal processor generates an image for viewing on the display 20.

The additional data source 22 provides additional data for display on the screen along with the acoustic data. Additional data may include one or more of the following: optical image data, IR data (including thermal imaging), GPS data, time, ambient conditions (such as weather conditions), altitude (absolute or relative to terrain), acoustic energy source used (and acoustic energy parameters such as amplitude and frequency), or other parameters.

The acoustic energy source may be an actuator located on the terrain, inducing vibrations in the terrain that induce acoustic vibrations in the target object. In other examples, the acoustic energy source may be a high-energy directed acoustic energy source. Acoustic energy sources are described in further detail below.

Actuators

A vibratory input can be provided directly to the surface of the terrain, for example using an actuator, such as a hydraulic actuator or electromagnetic actuator. A ground-based vehicle can be used to provide a vibratory input to the terrain (alternatively referred to as the ground). The actuator may be in mechanical communication with the terrain, for example through provision of impulses to the terrain surface. This approach may be termed forced ground response imaging.

The forced ground response imaging approach can be used with an acoustic sensor carried by an airborne vehicle, or otherwise located to receive acoustic signals from the ground. For example, the acoustic sensor may be supported by the same vehicle that provides the vibratory input, for example elevated above the vehicle on a pole.

Figure 2:
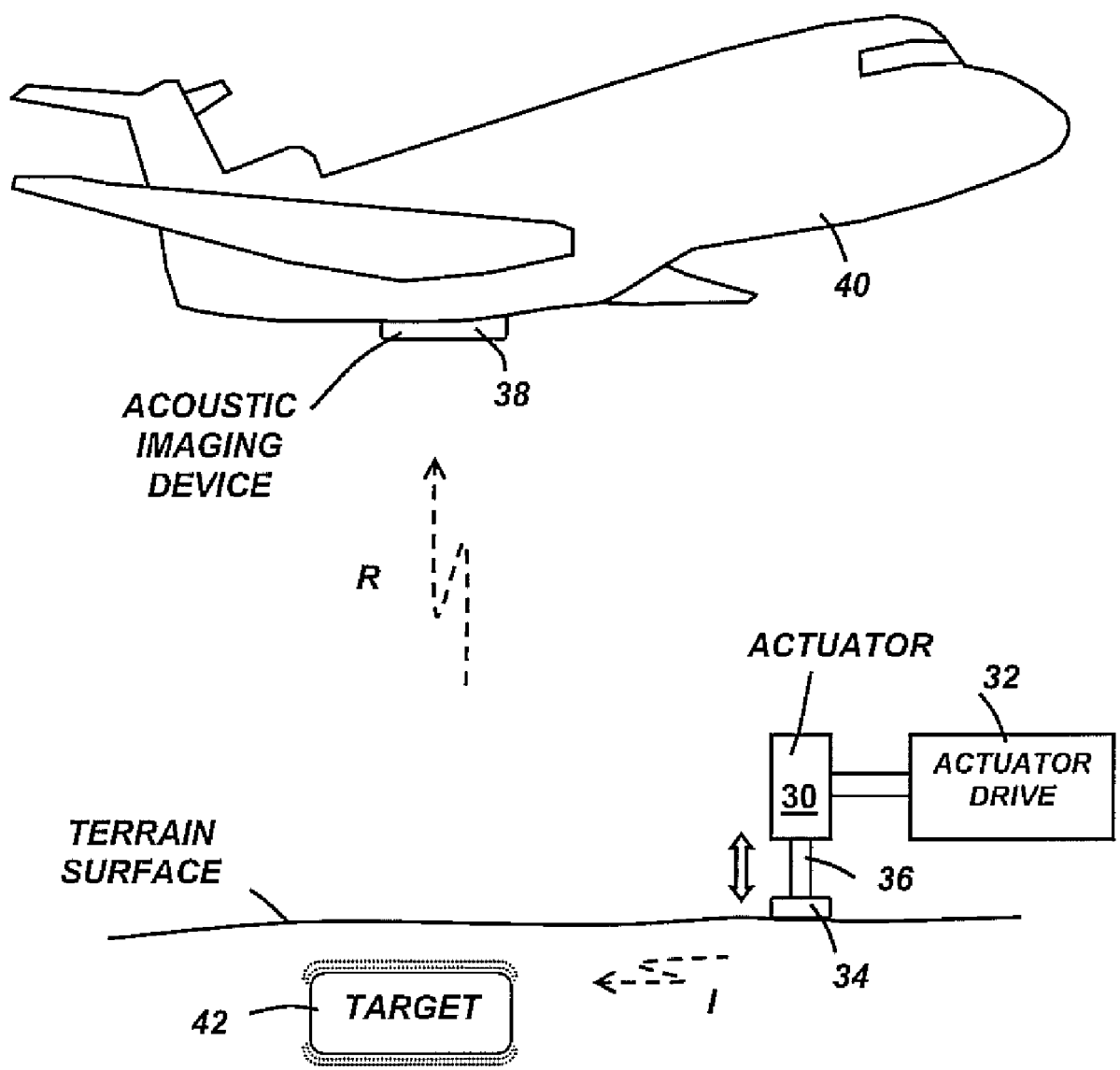
FIG. 2 illustrates an embodiment using an actuator as an acoustic energy source.

FIG. 2 shows another example of the present invention, comprising an actuator 30, with ground-contacting portion 34 moving up and down on rod 36, actuator drive 32 (which may be supported by a vehicle, not shown), and acoustic imaging device 38 carried by airplane 40. An associated electronic circuit, such as described above in relation to FIG. 1, allows a person on the airplane to view a visual representation of the acoustic image, for example a contour map of sound pressure amplitude. FIG. 2 is not to scale. The target object is represented at 42. Different approaches may be selected for different types of target objects, and the representation of the target object is for illustrative purposes only.

The acoustic imaging device may comprise a two-dimensional array of directional microphones, configured so as to image a portion of the terrain. The acoustic imaging device may be located at any location on or within the airplane that permits such imaging, and a shield may be provided to protect electronic sensors from the elements. The target object is represented at 42. The jagged line I represents acoustic energy transmitted through the terrain to the target object 42, and the jagged line R represents acoustic signal received by the acoustic imaging device. In this particular case, the acoustic energy is transmitted largely through the terrain.

In some examples, the surface of the terrain may be repetitively pounded. The actuator may also be oscillated. The actuator may be partially embedded in the ground, or may be coupled to a man-made or natural structure embedded in the ground, such as a pole, rock outcrop, tree root, or the like.

High Energy Directed Acoustic Energy Sources

In an example of reflected energy approach of detecting a target object, a high-energy directed acoustic energy source provides acoustic energy incident on terrain including the target object. The incident acoustic energy is absorbed, transmitted, and/or partially reflected, depending on the characteristics of the terrain. Here, the term "reflected" includes any acoustic signals that are induced in an object (e.g. by an acoustic pulse) that are returned to the acoustic imaging device. For example, the target object may be a mine buried under the ground, the mine having an acoustic resonance which shows up as a localized strong signal in an acoustic image. The reflected energy is detected by an acoustic sensor, and provides a characteristic surface signature from which the object can be detected. For example, the reflected acoustic energy may be measured by a microphone array.

The acoustic energy source may be co-located with the microphone array. For example, an acoustic energy source and a microphone array may both be configured to be carried by an aircraft, either mounted on the exterior of an aircraft or otherwise supported by the aircraft.

Figure 3:
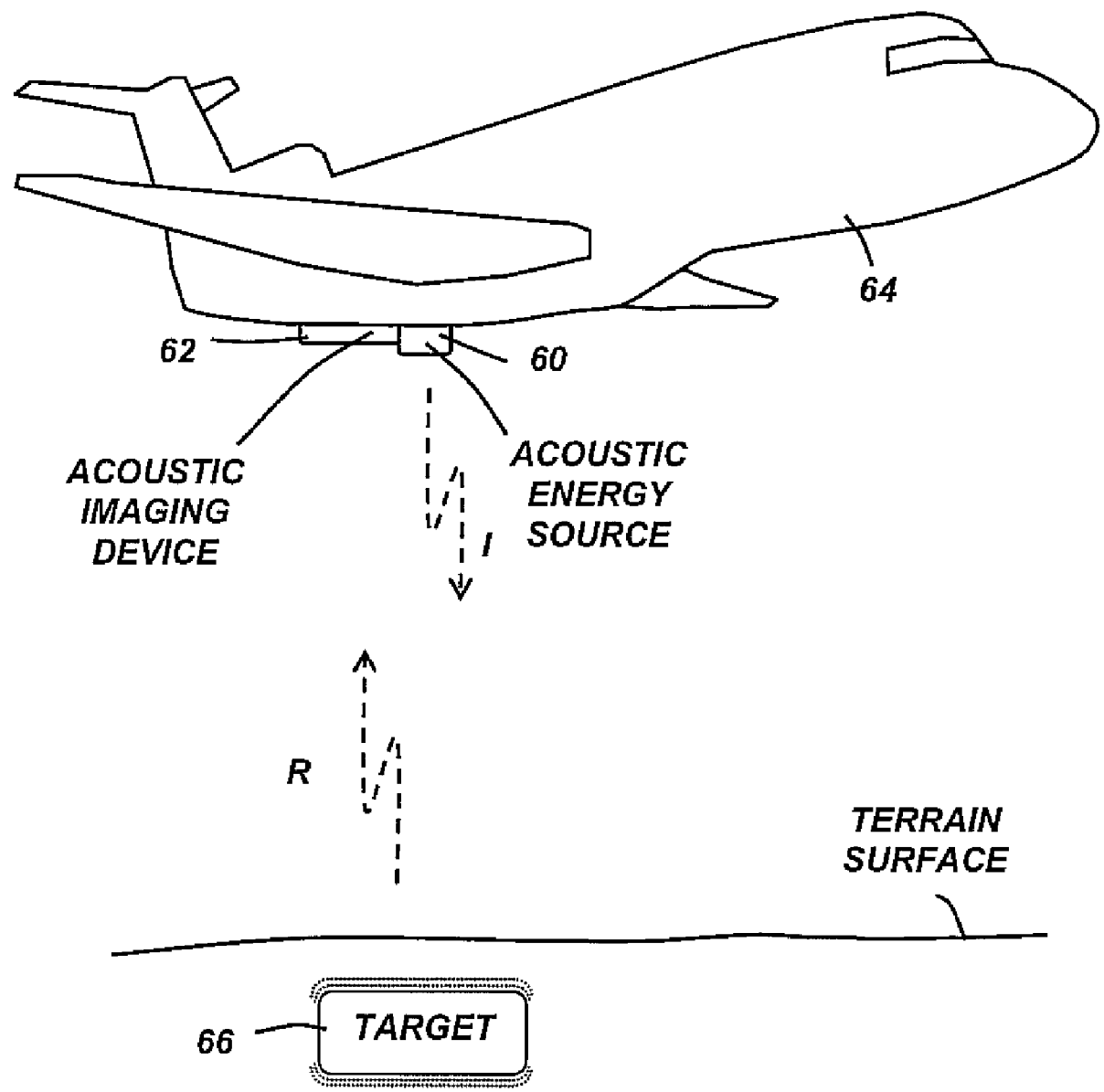
FIG. 3 illustrates an embodiment using a high energy directed acoustic energy source.

FIG. 3 shows a further example of the present invention. An acoustic energy source 60, in this example a high energy directed acoustic energy source, and acoustic imaging device 62 are both carried by an airplane 64. Acoustic energy is directed towards terrain including target object 66 (arrow I), and the imaging device images acoustic energy received from the terrain.

High-energy directed acoustic energy sources (sonic cannons) can be used to provide acoustic energy incident on the surface. For example, a Long-Range Acoustic Device (LRAD™) from American Technology Corporation of San Diego, Calif., can be used in embodiments of the present invention, such as the LRAD 3300. This has a maximum energy output of 146 decibels (sustained), or 151 decibels (burst) at 1 meter, and has a directionality of −20 db at +/−15 degrees at an emission frequency of 2.5 kHz. The LRAD 3300 has good thermal stability, and can be used to excite acoustic resonances within manmade objects.

Directional (or directed) acoustic energy sources, such as the directed stick radiator, are further described by Raida et al. in U.S. Pat. No. 5,940,347, the contents of which are incorporated herein by reference. The directed acoustic energy source may, in some examples, also be used as a directional microphone. For example, one or more directed acoustic sources may be included in a directional microphone array. The same device can be used to both generate a sound pulse and detect acoustic energy returned from the terrain. There will be a time delay between the generation and detection of reflected acoustic signals which can be used to time-gate the detected acoustic signal.

An LRAD typically operates between approximately 5 kilohertz and approximately 10 kilohertz. However, other excitation frequencies can be used, including infrasound excitation and ultrasound signals. The term "acoustic" is not limited to the usual human sensitivity frequency range. Excitation signals may be frequency and/or amplitude modulated. Preferably, the audio excitation is a sound pulse, such as a pressure wave, having a high degree of directionality.

Other Energy Sources

Acoustic energy can also be provided to a surface using explosives, engine noise including that of resonators associated with vehicle engines, projectiles directed at the ground, and other approaches. An excitation acoustic source may further have amplitude modulation, the modulation being chosen so as to further enhance resonance characteristics of the object.

Techniques to Improve Target Object Detection

A comparison of acoustic images from normal surfaces with those under which manmade objects are buried can provide the diagnostic capability needed to locate the buried objects. For example, if metal objects are to be detected under sand, acoustic image data can be collected from terrain comprising mostly sand, and also from terrain comprising both sand and metal objects. The acoustic signal originating from sand and metal objects can be normalized using the data obtained from sand alone (for example, by subtraction, division, or other processing), helping to highlight the acoustic signal obtained from the metal objects.

Filtering can be used to eliminate background noise, and isolate signals expected from the target object. Filtering may include electronic filtering of microphone signals (such as band-pass filtering in the region of expected resonances), or microphone configurations designed to receive a frequency range of interest. Attenuation by the ground reduces the acoustic response of a buried object.

However, the incident acoustic energy can be increased, or other techniques used to enhance the sensitivity. The incident acoustic energy may be modulated and phase-locked detection used. Further, the technique may be calibrated according to the expected depth of the buried object.

The acoustic imaging device (such as a microphone array) may be proximate to the ground to maximize the received energy. However, in practice, the sensitivity may be reduced through the distance between the microphone array and the ground.

The detection of the acoustic signal can be time-gated to remove contributions from noise. If the acoustic imaging device is a significant distance from the target object, for example on an aircraft, the detection may be delayed by a time corresponding approximately to the time for sound to propagate through the air. In further approach, the receiver electronic circuit is operable to eliminate data collected at the time of acoustic excitation (e.g., for pulsed excitation), either through communication with the acoustic energy source or through analysis of received data.

One or more of the following techniques can further be used to increase dynamic range. High-resolution analog-to-digital converters can be used to convert the received acoustic signal to a digital signal. Background noise can be reduced using passive measures, active noise control using a secondary source, and triggering data acquisition after shutting off the sound source. In the latter approach, the acoustic energy source is closed down before starting the reception of the reflected acoustic signal. For a pulsed energy source, detection of the acoustic signal can be gated to occur during intervals between energy pulses. Far-field noise localization can be achieved using acoustic imaging techniques.

The spectrum of received acoustic signals may be detected, allowing detection of minerals, oil deposits, and the like. In such examples, the detection electronic circuit may include a spectrum analyzer. Similarly, the spectrum provided by the acoustic energy source may also be variable or tunable.

An acoustic imaging technique may be combined with other techniques, such as thermal imaging and pattern recognition, to enhance target object detection, as discussed further below.

Combined Approaches

Detection techniques according to the present invention may be combined with other techniques, such as pattern recognition, thermal imaging, and the like. Detected acoustic signals can be compared with reference signals, from terrain in which there are no target objects, so as to detect characteristic frequencies of any objects in the reflected signal. The characteristic frequencies can be used to estimate the dimensions and/or material characteristics of the object, even if the surface of the object is concealed to visual observations. Other object characteristics, such as visual characteristics, thermal emission, radar response, and the like, can be determined at the same time and the object detected using a combination of techniques. In further examples, in relation to detection of explosive devices, such as mines, a projectile or other detonation-inducing process can be used after the object is detected. Embodiments of the present invention also provide an improved method of mine sweeping.

Other Aspects

Examples of the present invention can also be used to determine the composition of an object based on the acoustic signal detected from it. For example, the acoustic signature of a storage tank will be different if it is full or empty.

An acoustic energy source, acoustic imaging device, electronic circuit, and display may be part of a unitary apparatus. Such an apparatus may be portable, mounted on or in a vehicle, or otherwise located.

Figure 4:
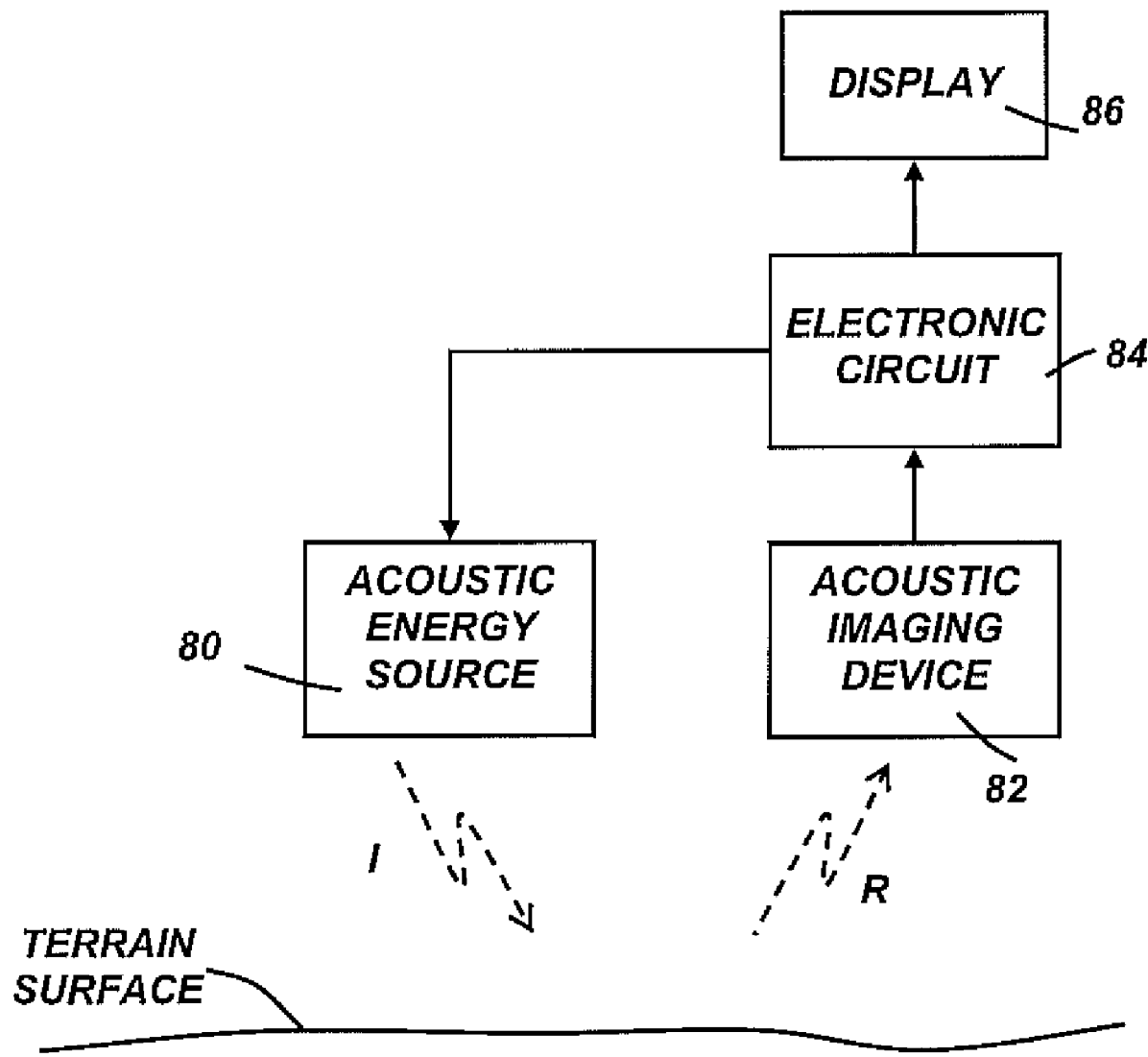
FIG. 4 is a simplified schematic of an apparatus according to an embodiment of the present invention.

FIG. 4 is a schematic of an apparatus including an acoustic energy source, an acoustic imaging device, an electronic circuit in communication with the energy source and imaging device, and a display for presenting a visual representation of the acoustic image. The electronic circuit may provide electrical energy pulses at intervals to the acoustic energy source, and receive image data during inter-pulse intervals. A rangefinder or other distance measuring device can be used for distance corrections (such as for and sound travel time). The electronic circuit may include filter, ADC, processor, or other components.

In other embodiments, the acoustic imaging device may be replaced by an acoustic sensor, and target objects detected from the received acoustic signal. In that case, the target object may be known to be within the field of view of the acoustic sensor, but not further isolated.

In other embodiments, the acoustic energy device may be used to generate energy pulses directed towards or focused on a detected target object, with the purpose of damaging or detonating the object.

Hence, a method of detecting an object comprises directing incident acoustic energy towards the object or its environs, for example terrain on which (or under which) the object is located. This may comprise directing acoustic energy at terrain including the object (for example, using a directed acoustic energy source supported on an aircraft), or by providing a vibratory input directly to the surface of the ground near the object (for example using an actuator). An acoustic signal including a component originating from the target object is detected, and the target object can be detected using the acoustic signal. The acoustic signal may be detected by an acoustic imaging device that provides an image signal, from which a visual representation of the acoustic image can be obtained. The object may be concealed from direct sight, for example as a buried or camouflaged object.

An example apparatus for providing an acoustic image of terrain includes a directed acoustic energy source that directs acoustic energy towards the terrain, and an acoustic imaging device that receives acoustic signals reflected from the terrain. The energy source and imaging device may both be carried by the same aircraft. The acoustic signals may include a component from a man-made target object within the terrain. A signal processor may receive image signals from the acoustic imaging device and provide an acoustic image of the terrain, from which the location of the object can be determined. The acoustic image may be displayed to a user as a false-color image. A positioning device such as a GPS can be used to associate positional data with the location of the target object. Apparatus according to the present invention can also be used for geological prospecting, with the acoustic images obtained being used to locate mineral resources and the like.

Examples of the present invention can be used to detect man-made objects on or within terrain, manmade objects on or beneath the surface of water, objects buried in snow or sand, and airborne objects concealed by vegetation or weather conditions such as fog or low clouds. For example, embodiments of the present invention can be used to provide improved guidance signals for vehicles, such as aircraft or land vehicles moving through fog. Examples also include collision avoidance systems, for example, in combination with radar-based approaches. Custom acoustic sensors (for example, highly directional sensors), analysis software, and other hardware may be constructed according to the desired application.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Patents, patent applications, or publications mentioned in this specification are incorporated herein by reference to the same extent as if each individual document was specifically and individually indicated to be incorporated by reference.

Having described our invention, we claim:

1. An apparatus for providing an acoustic image of terrain, the terrain including a target object, the apparatus comprising:
    an acoustic energy source, adapted to provide acoustic energy to the terrain;
    an acoustic imaging device, adapted to receive acoustic signals from the terrain and to provide image signals;
    an electronic circuit, adapted to receive the image signals from the acoustic imaging device and to provide display signals; and
    a display, adapted to receive display signals from the electronic circuit and to show an acoustic image, the acoustic image being a visual representation of the acoustic signals,
    whereby the target object is locatable using the acoustic image,
    wherein the acoustic energy source is a directed acoustic energy source,
    the acoustic energy source being configured so as to be supported on an aircraft and direct acoustic energy through air towards the terrain.

2. The apparatus of claim 1, wherein the electronic circuit is further adapted to receive a visual image of the terrain,
    the display showing the acoustic image overlaid on the visual image.

3. An apparatus for providing an acoustic image of terrain, the terrain including a target object, the apparatus comprising:
    an acoustic energy source, adapted to provide acoustic energy to the terrain;
    an acoustic imaging device, adapted to receive acoustic signals from the terrain and to provide image signals;
    an electronic circuit, adapted to receive the image signals from the acoustic imaging device and to provide display signals: and
    a display, adapted to receive display signals from the electronic circuit and to show an acoustic image, the acoustic image being a visual representation of the acoustic signals,
    whereby the target object is locatable using the acoustic image,
    wherein the acoustic energy source is an actuator,
    the actuator being in mechanical communication with the terrain and imparting vibrational energy to the terrain.

4. The apparatus of claim 3, wherein the actuator is a hydraulic actuator.

5. The apparatus of claim 1, wherein the acoustic energy source is a high energy directed acoustic energy source.

6. The apparatus of claim 5, wherein the acoustic energy source and acoustic imaging device are configured so as to be both supported on an aircraft.

7. The apparatus of claim 1, wherein the electronic circuit includes a filter, the filter being configured to selectively transmit image signals at frequencies proximate to an expected mechanical resonance of the target object.

8. A method of detecting a target object, the target object being located within terrain, the method comprising:
    directing acoustic energy through air towards the terrain using a directed acoustic energy source supported on an aircraft;
    receiving an acoustic signal from the terrain, the acoustic signal including a contribution from the target object;
    forming an acoustic image using the acoustic signal, the acoustic image being a visual representation of a spatial distribution of acoustic signal strength received from the terrain; and
    locating the target object using the acoustic image.

9. The method of claim 8, wherein the target object is a man-made object, the target object inducing a relatively high level of acoustic signal strength compared with surrounding terrain.

10. The method of claim 9, wherein the man-made object is buried within the terrain.

11. The method of claim 8, wherein the acoustic energy is directed towards the terrain using a high energy directed acoustic energy source,
    the high energy directed acoustic energy source being a sonic cannon.

12. The method of claim 8, wherein the terrain comprises water having a water surface, and the target object is located below the water surface.

13. The method of claim 8, wherein the acoustic signal is received from the terrain using an acoustic imaging device supported by the aircraft.

* * * * *